United States Patent [19]

Lester

[11] Patent Number: 4,930,377

[45] Date of Patent: Jun. 5, 1990

[54] TIRE REPAIR KIT

[76] Inventor: Mark Lester, 20 Skimhampton Rd., Easthampton, N.Y. 11937

[21] Appl. No.: 311,706

[22] Filed: Feb. 15, 1989

[51] Int. Cl.⁵ .............................................. B60C 25/16
[52] U.S. Cl. ........................................ 81/15.2; 7/100; 7/158; 7/165; 7/167
[58] Field of Search .................... 81/15.2, 15.7, 177.4, 81/177.5, DIG. 7; 7/100, 158, 165, 167

[56] References Cited

U.S. PATENT DOCUMENTS

| | | |
|---|---|---|
| 611,972 | 10/1898 | Meeker . |
| 1,472,812 | 11/1923 | Pawsat ................................. 81/15.7 |
| 2,714,409 | 8/1955 | Primrose et al. .................... 81/177.4 |
| 3,013,454 | 12/1961 | Gruber ................................. 81/15.7 |
| 3,313,189 | 4/1967 | Marra .................................. 81/15.7 |
| 3,783,715 | 1/1974 | Niconchuk ........................... 81/15.7 |
| 3,945,273 | 3/1976 | Wolk .................................... 81/15.7 |

FOREIGN PATENT DOCUMENTS 532341  11/1921  France ..................................... 7/167

Primary Examiner—Roscoe V. Parker
Attorney, Agent, or Firm—Kelly and Hulme

[57] ABSTRACT

There is disclosed in the specification a tire repair device and kit for inserting plugging material typically in the form of rubber coated twisted strands into a tire puncture. The device and kit is provided with one or more interchangeable tools such as a strand inserting needle, an awl, a knife, and screwdriver, said tools being interchangeably joinable with the handle of said device. In operation the awl is first joined with said handle and used to enlarge the puncture, if necessary. The inserting needle tool is then joined to the handle. The plug material is threaded into the open eye of the needle and inserted into the puncture. The inserting motion is limited by a stop bushing captive on said needle tool so that the ends of the strands are not drawn into the puncture. The stop also limits the withdrawal of the needle. After the strand has been inserted in accordance with the present invention the knife tool may then be attached to said handle and used to trim off any excess strand of material extending out of the puncture.

20 Claims, 3 Drawing Sheets

TIRE REPAIR KIT

The present application relates generally to a tire repair device and kit for use in the insertion of plugging material into punctures in tubeless automobile tires and more particularly to a device and kit especially adapted for inserting plugging material in the form of a twisted rubber coated fibrous strand into such punctures and for trimming and excess thereof.

BACKGROUND OF THE INVENTION

The repair of punctures in tubeless automobile tires is conventionally accomplished with fibrous strands which are forced into the puncture from the exterior of the tire by inserting a portion of the strands through the puncture in the tire leaving two free ends outside thereof. The portion so inserted is then withdrawn thereby positioning four plys of strand in the puncture. Unless care is taken, however, the inserting tool is sometimes pushed too deeply into the tire, with the result that the free ends of the strand material are projected into the tire and the strand is lost. On the other hand, if the inserting tool is withdrawn too far out of the tire, the strand may be removed completely from the puncture and the inserting operation would have to be re-initiated.

Some of these problems have been obviated by the tire repair tool disclosed in U.S. Pat. No. 3,783,715. However, in the repair of tire punctures, it is often necessary to have tools other than the tool disclosed in that patent. For example, it is often the case that before a tire puncture can be repaired, the puncture itself must be somewhat expanded or enlarged in order to be of a size sufficient to receive the fibrous strand of material that is used to plug same. In addition, any excess material extending out of the hole after same has been inserted must be trimmed so that the operation of the tire is not in any way interfered with or impacted. For example, if the free ends of the strand material remain hanging out of the filled puncture hole, it is likely that the loose end could catch and be pulled entirely out of the puncture, thereby reproducing the hole that had been repaired.

It is accordingly an object of the present invention to provide a tire repair tool which will improve the efficiency of the repair of punctures in tubeless automobile tires.

It is another object of the present invention to allow for the quick and efficient repair of punctured tires.

It is yet another object of the present invention to provide a kit which contains all the tools necessary for undertaking said repair.

These and other objects will become apparent from the following description and claims in conjunction with the drawings which form a part of this disclosure.

SUMMARY OF THE INVENTION

In accordance with the present invention, a tire repair device and kit are provided which is comprised of a handle member, one or more tools and means for interchangeable joining one of the tools to the handle. In a preferred embodiment, the handle member is comprised of two handle portions which when joined together form an internal, enclosed space therebetween in which the tool or tools, the plug material and the like may be maintained and stored.

The tool joining means preferably forming a part of this invention is comprised of a tool receiving flange having a longitudinal bore therethrough which may receive said tool. The flange itself extends from the handle member with a portion thereof being formed as part of each handle portion.

A slip ring is also provided which may be inserted over said flange which prevents the separation of said handle member and the tool receiving flange, thereby retaining a tool therein.

The kit of the present invention may be provided with one or more tools useful in the repair of tire punctures. These interchangeable tools may be stored within the space formed of the handle members thereby forming a tire repair kit. In a preferred embodiment, the tools contained in the kit include a knife, an awl, a screwdriver and a plug material inserting needle. In addition, the puncture plugging material itself may be stored within said handle.

As an alternative to providing separate interchangeable tools for use in combination with the device and kit of the present invention, a single tool shaft having a bore in one end thereof may be provided, which bore may receive one of several magnetic tool bits, which bits have a first end receivable by said bore and have a second end in the shape of a useful tool.

DETAILED DESCRIPTION OF THE INVENTION

Figure 1:
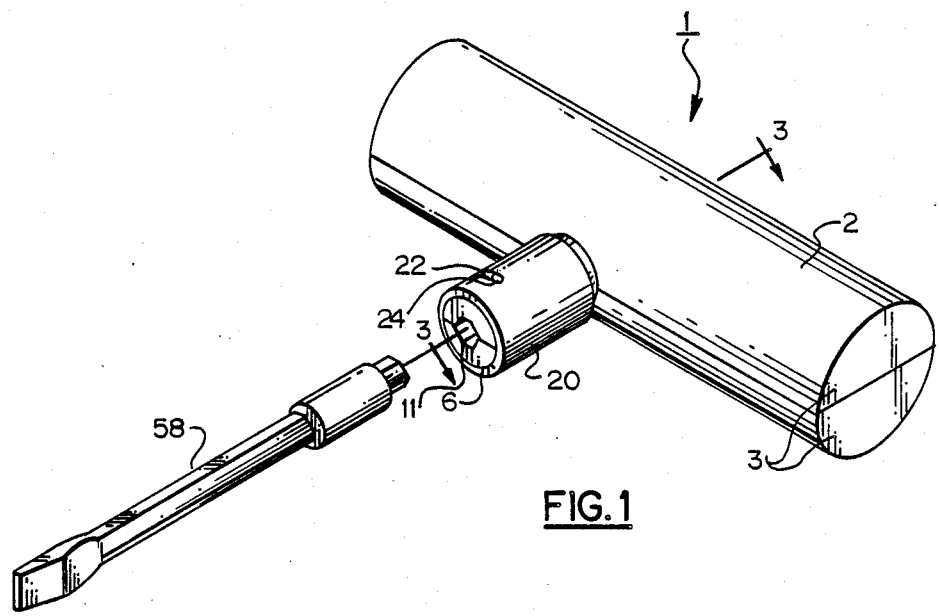
FIG. 1 is a perspective view of the handle and one possible tool of the tire repair tool of the present invention.
Figure 2:
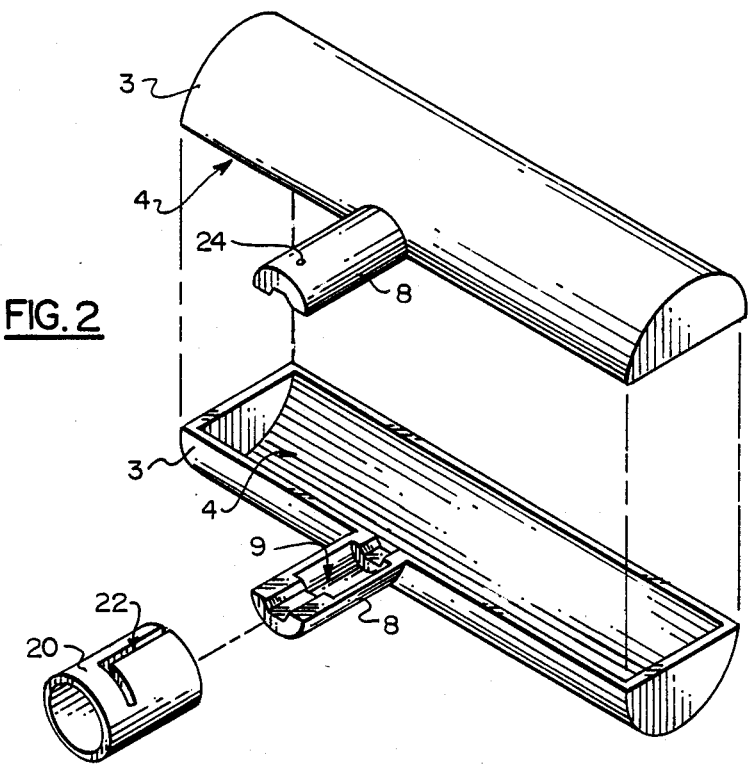
FIG. 2 is a perspective exploded view of the handle of the present invention showing the space created within said handle.
Figure 3:
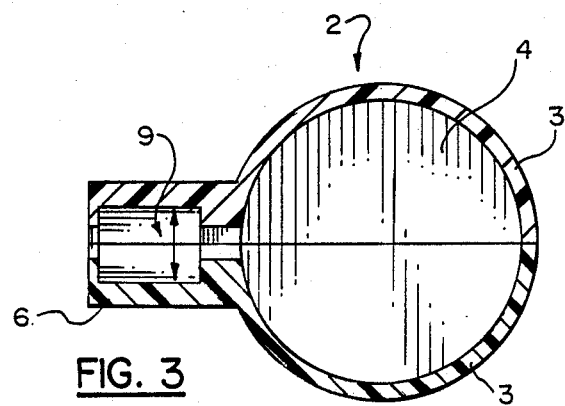
FIG. 3 is a cross-sectional view taken along line 3—3 of FIG. 1.

Referring now to the drawings, it is seen that a device 1 in accordance with the present invention is comprised of a tool handle member 2 which is formed of two handle portions 3 which portions when joined together formed an enclosed, internal space 4 within handle 2 wherein tools, plugging material and the like may be stored and maintained.

From the drawings it can be seen that handle portions 3 have a generally semicircular cross-section, however, it will be clear to one skilled in the art that any cross-sectional shape that produces an enclosed, internal storage space within said tool is suitable.

Extending from said handle member 2 (in preferably a perpendicular orientation to the longitudinal axis of handle 2) is a tool receiving flange 6. The receiving flange 6 is formed from flange portions 8, one such flange portion 8 extending from each of handle portions 3. The tool receiving flange 6 defines a longitudinal bore 9 therethrough which bore has a relatively smaller diameter 11 at each terminal end of said bore and expands to a relatively larger diameter 13 therebetween. The bore 9 is used to receive and maintain a tool in a fixed relationship to said handle 2.

Finally, s slip ring 20 is provided which may slip over said tool receiving flange 6 such that the handle portions 3 may be maintained in a joined relationship with each other. Slip ring 20 defines a slot 22 which has a first part extending from one end and along a portion of the slip ring 20 in a direction parallel to the longitudinal axis of said slip ring. A second part of slot 22 extends from the internal end of the first slot part in a direction generally perpendicular thereto and along a portion of the surface of said slip ring 20.

Slot 20 receives a pin 24 defined on the surface of one of the flange receiving portions 6. The slip ring 20 is slipped forward on flange 6 until pin 24 comes to the inner end of the first slot portion. The ring 20 is then rotated so that the pin 24 is engaged by the second slot portion. In this way, the ring 20 will securely maintain handle portions 3 in a joined relationship and as seen below, this arrangement also maintains the tool of choices in engagement with the handle 2.

Figure 4:
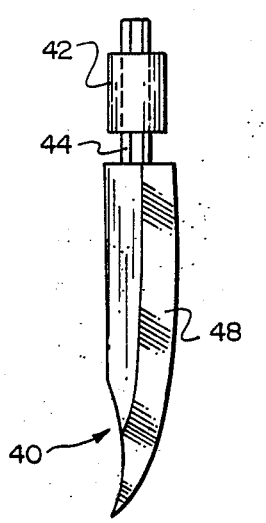
FIG. 4 and 5 are examples of interchangeable tools which may usefully be contained in the kit of the present invention.
Figure 5:
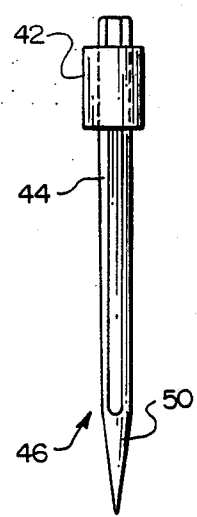
Figure 6:
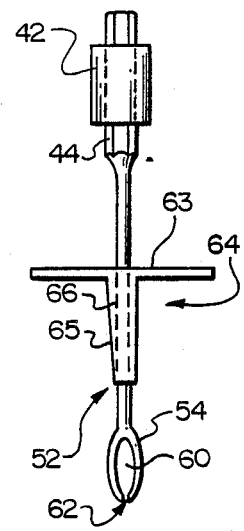
FIG. 6 is a side view of the plug inserting needle used in combination with the kit of the present invention.

As indicated above, the device 1 of the present invention may be provided with a plurality of tools. Typical of these tools are a knife 40 (FIG. 4), an awl 46 (FIG. 5) a screwdriver 58 (FIG. 1) and a plug material inserting needle 52 (FIG. 6).

Each of these tools is comprised of an elongated shaft 44 having a first end and a second end; and a collar 42 defined adjacent to said first shaft end receivable by said expanded bore portion 13. The portion of shaft 44 located adjacent to each side of collar 42 is received by the terminal ends 11 of bore 9.

Figure 7:
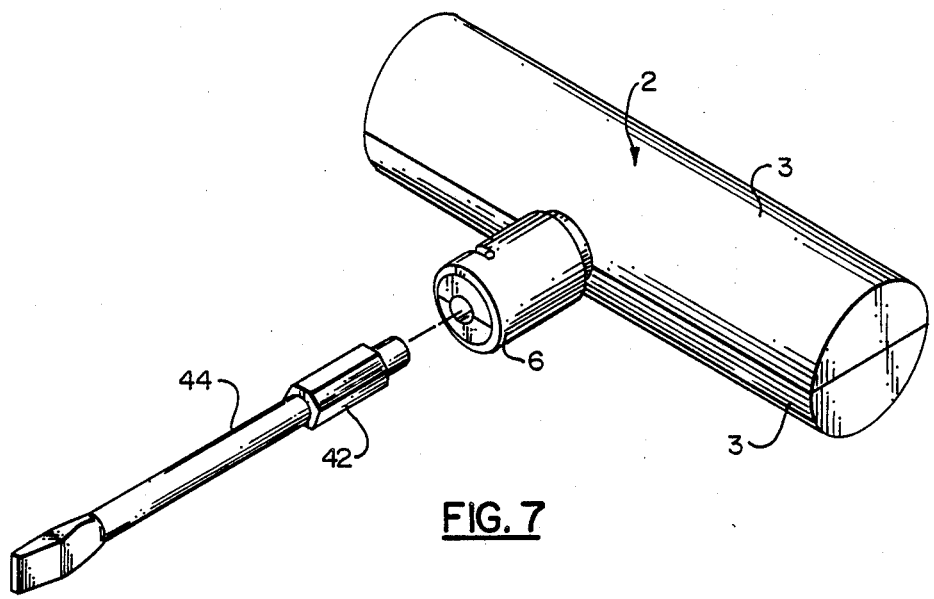
FIG. 7 is a perspective view of an alternate embodiment of the handle and tool of the present invention.

It will be clear to one skilled in the art that the shape of either the terminal bore ends and tool shaft 44 or the collar 42 should have a cross section other than circular to prevent rotation of the tool when said tool is disposed within the tool receiving flange 6. As can be seen by FIG. 1 and FIG. 7, either arrangement is functional. However, in a preferred embodiment of the present invention, the tool shaft 44 is round and the collar 42 has a cross section something other than circular. This arrangement provides for the most stable engagement of the tool by the handle. It will be equally clear to one skilled in the art that the cross sectional shape of the bore ends 11 and inner bore portion 9 of the tool receiving flange 6 should match the shape of the shaft portion and/or collar which they receive.

Finally, each tool 40, 46, 52, and 58 at a second end thereof defines an operable tool member such as a knife blade 48, a pointed awl 50, a screw driver head 58 or a plug material inserting needle 54.

Figure 8:
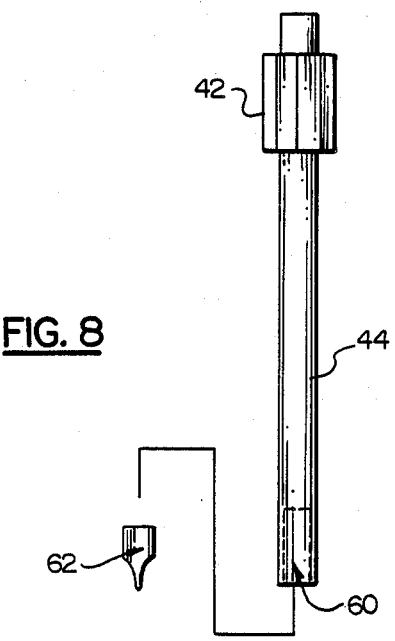
FIG. 8 is a front view of an alternate embodiment of the interchangeable tool of the present invention.

As an alternative to providing a plurality of complete tools in accordance with the present invention and as depicted in FIG. 8, a single tool is provided, said tool having a first end and a second end with a collar 42 defined adjacent to said first end, which collar 42 as described above, is receivable by the inner bore portion 9 of tool receiving flange 6. However, rather than having a tool defined at the second end of said shaft, there is defined a bore 60. Provided with this alternative tool shaft is a plurality of tool bits 62 which bits have a first end shaped such that they may be received by bore 60 and further having a second end which defines a useful tool. In FIG. 8 is depicted such a tool bit in the form of a screwdriver. However, this second bit end may be formed in any useful manner. It will be clear to one skilled in the art that a bit may be provided having a second end shaped to provide for phillips screwdriver, regular screwdriver, alan wrenches, an awl, and even an inserting needle as more completely described above. Furthermore, the tool bit 62 may be magnetic in nature such that when inserted into bore 60, the magnetic forces will assist in maintaining said bit 62 in a joined relationship with said shaft.

Finally, in still another embodiment of the present invention, the handle halves 3 may be hinged together along one edge thereof such that the handle 2 may be opened and closed along said hinge for the insertion and removal of the tools used in accordance with the present invention with the slip ring 20 still being provided to maintain the device in a closed relationship.

Referring specifically to the plug inserting needle 54 (see FIG. 6), it is comprised of an open eye 60 at said second shaft end, said eye being formed by a pair of opposed spring tempered arms which arms define a slot 62, which is narrower than the thickness of the plug strand material which slot 62 receives.

A stop bushing 64 is retained captive on the shaft 44 between the collar 42 and the eye. The bushing 64 is formed with a flange 63 and an integral abutment collar 65. The bushing 64 defines a opening 66 along its length such that the bushing 64 fits loosely on the shaft 44 of the needle 52.

In using the tool, the approximate mid-point of a length of twisted plug strand material is inserted into the eye 60 via slot 62. The needle 52 and engaged plug material are then inserted into the puncture and forced into the tire as deeply as possible until the stop collar 65 abuts the tire and prevents further penetration. The strand material should be of such a length that under these conditions, the ends of the strand material still extend outside the puncture.

Next, one hand is pressed down upon the flange 63 to hold the stop collar 65 in engagement with the tire while the needle 52 is withdrawn from the tire puncture. During the withdrawal, the plug material strand engaged by eye 60 slides to the lower end of the eye 60 and as the eye and strand material enter the puncture between the two legs of the strand material as originally inserted in the puncture, the added resistance pushes the strand out of the slot 62 thereby leaving that portion of the strand material wedged between the legs to form a plug. The needle 52 emerges from the puncture completely free from the strand, the portion of the needle containing the eye 60, having been withdrawn into a counterbore (not shown) which may be provided in collar 65. The stop bushing 64 which is positioned over the strand material filled puncture, in combination with the counterbore, allows the needle 52 to be removed from the puncture while applying a force to the strand material (via bushing 64) which keeps the strand material disposed within the puncture.

After the plug material has been inserted, the needle 54 may be removed for the handle 2 and replaced with the knife blade 40 which may then be used to trim any excess plug material from the tire.

An awl 46 is also provided for use with the present invention as it is often necessary to increase the size of the tire puncture before an adequate plug may be inserted.

The arrangement of a single ply of plug material is suitable for relatively smaller punctures. However, for larger punctures, the plug material should be twice as long and inserted double in the needle eye.

What is claimed is:

1. A tire repair device for inserting a plug strand material into a tire puncture comprised of:
   a handle member, said handle member being comprised of two handle portions, which portions when joined together to form an enclosed, internal space within said handle, wherein a tool, plug material and the like may be stored and maintained;
   a tool; and
   means for interchangeably joining said tool to said handle, wherein said tool joining means is comprised of a tool receiving flange which extends from said handle member, a portion of said flange being formed in each of said handle portions, said flange further defining a longitudinal bore therethrough said bore having a first smaller diameter at the terminal ends thereof and a second larger diameter along an internal portion thereof.

2. The device of claim 1 further comprising means for maintaining said handle and receiving flange portion in a joined relationship.

3. The device of claim 1 wherein said tool is comprised of:
   an elongated shaft;
   a collar located adjacent to a first end of said shaft, said collar being receivable by said internal bore portion, the portion of said shaft adjacent to said collar being receivable by said terminal bore ends; and
   an operable tool member at a second shaft end.

4. The device of claim 3 wherein the shape of said shaft and collar are substantially the same as that of said bore.

5. The device of claim 4 wherein the cross sectional shape of said collar and said, internal bore portion is non-circular.

6. The device of claim 3 wherein said operable tool member is formed by a tool bit having a first end insertable within a bore defined at the second end of said shaft, said tool bit having a second end defining a useful tool.

7. The device of claim 3 wherein said operable tool member is a knife blade.

8. The device of claim 3 wherein said operable tool member is a screw driver.

9. The device of claim 3 wherein said operable tool member is an awl.

10. The device of claim 3 wherein said operable tool member is a plug material inserting needle.

11. The device of claim 10 wherein said plug material inserting needle is comprised of:
    an eye opened at the second end of said shaft, said eye formed by a pair of opposed spring tempered arms which arms define a slot narrower than the thickness of the plug strand material;
    a stop bushing slideably captive on said shaft between said first and second shaft end which stop bushing may be maintained in contact with the tire while the needle is inserted into and withdrawn from said tire.

12. The device of claim 11 wherein said stop bushing defines a counterbored at one end thereof to such a diameter and depth that said eye may be received within said counterbore.

13. The device of claim 12 wherein said stop bushing is comprised of a bushing flange engageable by one hand of the device user and a bushing collar positioned between said flange and the needle eye, said bushing collar containing said counterbore.

14. A tire repair kit for inserting a plug strand material into a tire puncture comprised of:
    a handle member, said handle member being formed of two handle portions, which portions when joined together, form an enclosed internal space within said handle wherein a tool, plugging material and the like may be stored and maintained;
    means for interchangeably joining a tool to said handle member, wherein said tool joining means is comprised of a tool receiving flange which extends from said handle member, a portion of said flange being formed in each of said handle portions, said flange further defining a longitudinal bore there through, said bore having a first smaller diameter at the terminal ends thereof and a second larger diameter along an internal portion thereof;
    a knife tool;
    an awl tool;
    a screwdriver tool; and
    a plug material inserting needle tool wherein each said tool may be interchangeably joined with said handle member.

15. The kit of claim 14 wherein each of said tool is comprised of:
    an elongated shaft;
    a collar extending around said shaft joined thereto and adjacent to a first end of said shaft, said collar being receivable by said internal bore portion, the portion of said shaft adjacent to said collar being receivable by said terminal bore ends; and
    an operable tool member located at said second shaft end, wherein the shape of said shaft and collar are substantially the same as that of said bore.

16. The device of claim 15 wherein the cross sectional shape of said collar and said internal bore portion is non-circular.

17. The device of claim 15 wherein said operable tool member is formed by a tool bit having a first end insertable within a bore defined at the second end of said shaft, said tool bit having a second end defining a useful tool.

18. The kit of claim 15 wherein said needle tool is comprised of:
    an eye opened at the second end of said shaft and formed by a pair of opposed spring tempered arms, which arms define a slot narrower than the thickness of the plug strand material;
    a stop bushing slideably captive on said shaft between said first and second end which stop bushing may be maintained in contact with the tire while the needle is inserted into and withdrawn therefrom; wherein said stop bushing further defining a counterbore at one end thereof to a diameter and depth such that said eye may be received within said counterbore.

19. The kit of claim 18 wherein said stop bushing is comprised of a bushing flange engageable by one hand of the user of the devise and a bushing collar positioned between said flange and the needle eye, the bushing collar containing said counterbore.

20. The kit of claim 14 further comprising a length of plug strand material which material may be maintained and stored within said handle.

* * * * *